United States Patent Office 2,935,503
Patented May 3, 1960

2,935,503

PRODUCTION OF NISIN

Henry Bernard Hawley and Ronald Henry Hall, Yeovil, England, assignors to Aplin & Barrett Limited, Yeovil, England No Drawing. Application June 2, 1958
Serial No. 738,958

Claims priority, application Great Britain June 17, 1957

3 Claims. (Cl. 260—112)

The invention relates to the production of liquid or solid nisin preparations of high nisin titre.

Nisin is the name given to the mixture of polypeptides produced by growing nisin-producing strains of Streptococcus lactis on an appropriate growth medium. The material is inhibitory of various micro organisms notably of many strains of Clostridia.

In accordance with the invention nisin preparations are produced by a process comprising the steps of growing a nisin-producing strain of Streptococcus lactis in a culture medium containing milk caseinogen, precipitating casein or paracasein from the culture medium, bringing the pH to a value less than 4.5, separating the precipitated casein or paracasein and recovering the nisin in the whey by froth concentration. The nisin may be precipitated from the recovered froth by salting out, and further purified by redissolving it and re-precipitation.

Nisin itself has surface active properties but the addition of a small quantity, not exceeding 0.1% of an appropriate foaming agent will facilitate the production of froth. The culture medium in which the Streptococcus lactis is grown in the first phase of the process may comprise whole milk, skimmed milk or reconstituted milk prepared from whole milk powder or skimmed milk powder. The conditions for growth or Streptococcus lactis in such medium for nisin production are already known. Generally, heat sterilisation of the culture medium before inoculation is desirable and it is also desirable that during the production of nisin the pH of the culture medium should be maintained at a value of about 6.0 by continuous or intermittent addition of alkali. When the production of nisin is complete the pH of the culture medium may be brought to a value of about pH 5.8 to cause casein to separate as a curd or alternatively the caseinogen in the milk may be converted into para-casein by the addition of rennin or a similar enzyme.

The casein or paracasein is then separated from the remaining culture medium or whey by physical methods such as skimming off the curd or draining off the whey, and the whey then transferred to a froth concentration plant.

In this plant upright tubes are provided at the bottom with air distributors whereby air is introduced into the liquid which they contain and the whey is circulated through the lower ends of the tubes so as to form a short column at the lower ends. The addition of 0.1% of a nonionic surface active agent such as a partial higher fatty acid ester of a polyhydroxy alcohol (e.g. the substance available under the registered trademark "Tween 80") is advantageous.

The introduction of air at the bottom of the tubes causes a foam to be produced and the foam reaching the top of the tubes contains the greater part of the nisin in the original whey. This foam is collected. It is preferable to collapse the foam before collection so as to reduce the volume to be collected and this may be achieved by providing at the top of each tube a rapidly rotating smooth disc.

The concentrate (i.e. collapsed foam or "spumate" as it is often called) which has been collected may then be further worked up by salting out the nisin by the addition of sodium chloride, preferably acetone is also added to complete the collapsing of the foam. The solid precipitate obtained by salting out may be re-dissolved in methanol and then again precipitated by the addition of acetone.

The final product is a dry free flowing powder of high nisin titre.

The invention is further illustrated in the following example:

A nisin producing strain of Streptococcus lactis is grown in a milk culture until the nisin titre amounts to 1,000 Reading units per ml. To 30 litres of this culture medium, at a pH within the range 6.0 to 6.3, rennet and calcium chloride are added to precipitate paracasein. The precipitated curd is cut up and the pH of the whey adjusted to 4.5 by the addition of hydrochloric acid. The whey is drained off and the curd washed with water which has been acidified to a range 4.0 to 4.5 to remove nisin adhering to the curd and the washings and whey are combined the pH being then adjusted to 5.0. This gives approximately 30 litres having a nisin titre of 800 Reading units per ml.

The liquid is then transferred to a circulating system having upright foam tubes and 0.1% of Tween 80 is added. Each tube is provided at the bottom with an air distributor so that foam rises up each tube and is collected at the top. In this way 550 ml. of collapsed foam or spumate is collected having a nisin titre of 40,000 Reading units ml. The collected spumate may be worked up to give a solid nisin product by saturating it with sodium chloride and adding 27 ml. of acetone. The resulting precipitate is removed and extracted with 500 ml. of methanol, the solution then being centrifuged to remove any insoluble material. To the clear solution 1,000 ml. of acetone is added. The resulting active precipitate is dried in air or vacuo and ground to give 11.9 grams of a white powder having a nisin titre of $1.4 \times 10^6$ Reading units per gram.

It will be appreciated that though air is the most convenient gas for foam production, any gas which is inert towards nisin may be used, such alternative gases being for example nitrous oxide, carbon dioxide or nitrogen.

We claim:

1. A process for the production of a nisin preparation from a liquid culture medium containing nisin and milk caseinogen, comprising the steps of precipitating the caseinogen in said culture medium as a curd, bringing the pH of the liquid in contact with the curd to a value not greater than 4.5, separating the curd from the liquid, adding a foaming agent to said liquid in a quantity up to 0.1%, and passing a gas through such liquid to produce a foam in which the nisin content of the liquid is concentrated.

2. The process of claim 1 comprising in addition collapsing the foam and collecting the collapsed foam.

3. The process of claim 2 in which said foam is collapsed by contact with a rotary plate.

References Cited in the file of this patent

UNITED STATES PATENTS 2,785,108    Hawley _____ Mar. 12, 1957

FOREIGN PATENTS 688,423    Great Britain _____ Nov. 26, 1952